Patented June 2, 1953

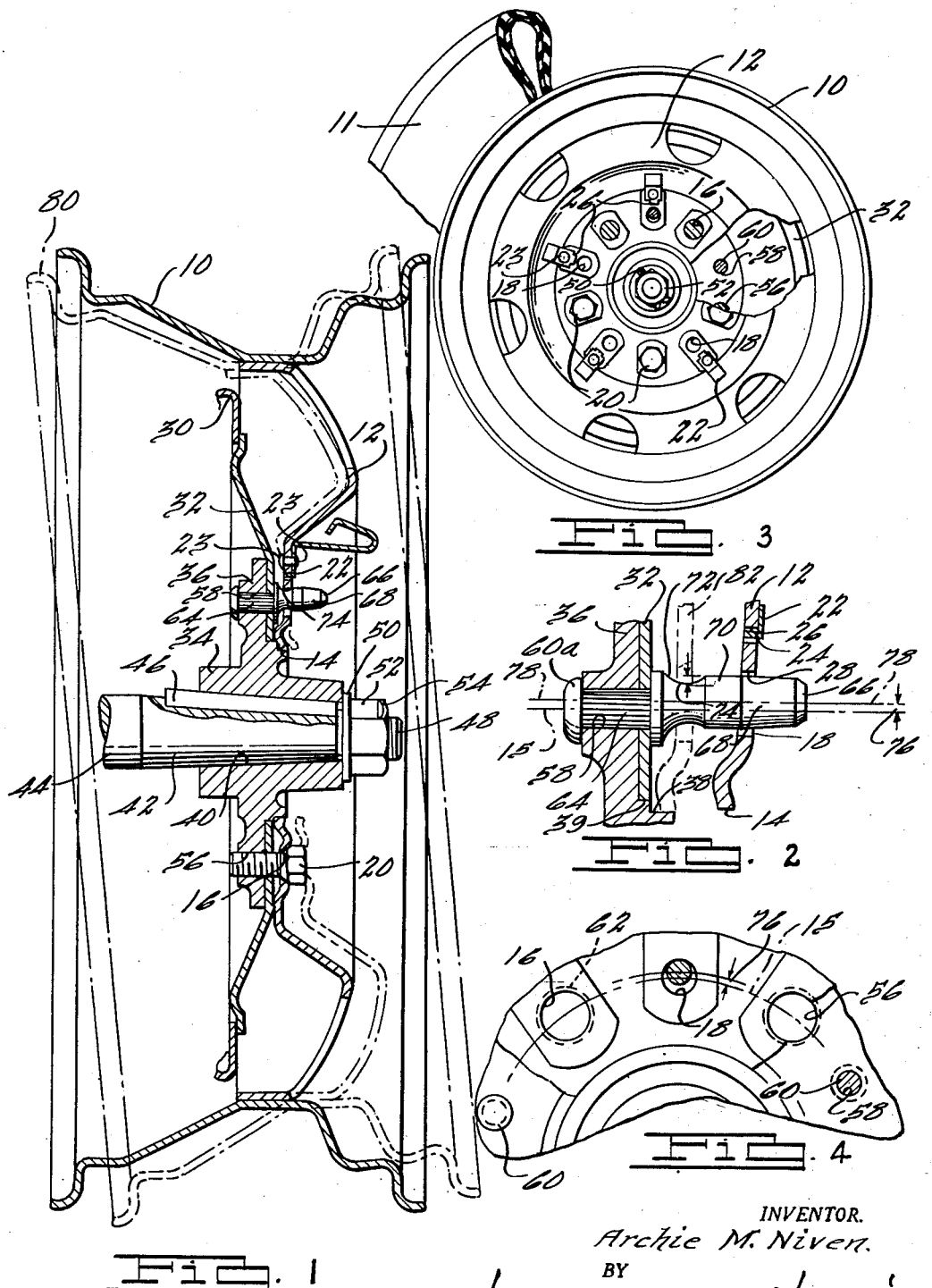

2,640,729

UNITED STATES PATENT OFFICE 2,640,729

WHEEL STRUCTURE

Archie M. Niven, Detroit, Mich., assignor to Chrysler Corporation, Highland Park, Mich., a corporation of Delaware Application December 26, 1950, Serial No. 202,744

5 Claims. (Cl. 301—9)

This application relates to pilot studs secured to wheel hubs for guiding wheels onto the hubs during the wheel mounting operation, and more particularly to a pilot stud having an eccentric shank and a depression therein, and a retaining shoulder adjacent the depression for facilitating the retention of a bolt-attached automotive road wheel in centered position relative to the wheel hub during application of the wheel bolts.

According to the instant improvement the pilot stud is used with a hub having a ring of rivet-receiving openings which register with wheel guide openings forming a similar ring of openings in a road wheel. In the rivet-receiving openings of the hub is received a number of rivet members including one knurled rivet member which provides a pilot stud portion slightly eccentric with respect to the rivet member proper. Such eccentricity accounts for the fact that the wheel is initially piloted by the stud in an off-center position relative to the hub. A transverse depression in the stud portion, however, receives the edges of the guide opening on the wheel and permits the wheel to be swung thereabout into concentric relationship with the hub, it becoming thereupon necessary that the wheel be swung back and then transversely shifted relative to the hub before the edges of the wheel guide opening can be withdrawn from the depression and the wheel completely disassociated from the hub assembly.

According to a feature of the present invention, the above described retention of the wheel, owing to a portion thereof being received in the pilot stud depression, is made possible through use of a special rivet member received in any one of the openings in the ring of regular rivet-receiving openings, the special member providing an eccentric portion which creates an offset effect relative to the circular path of the ring of openings.

According to a further feature, the eccentric portion of the special rivet member is prevented from being rotated about the axis of the rivet member proper and into coincidence with the path of the rivet opening ring by providing a simple means on the rivet member proper not involving splines, keys, registering lugs, and the like. The means provided consists of simple straight knurling which lends a slight fluted effect to the rivet member proper, the flutes upon being forced into the rivet-receiving opening causing the opening to deform somewhat and provide interfitting portions cooperating with the flutes to prevent relative rotation of the rivet member within the opening.

According to still a further feature, the improved wheel guide pilot stud helps to provide for the retention of the road wheel in place while the wheel bolts are being applied, and in the usual circumstance, without the need of any attention or assistance from the operator who is thus rendered free to use both hands in starting the wheel bolts and devoting his entire attention otherwise than to steadying the road wheel or preventing it from falling off the wheel-supporting hub. Though the invention specifically offers the foregoing advantage of freeing the operator from having to steady the wheel while bolting it into place, it may be found under certain circumstances that the steadying influence of the operator's hand may be desirable to the extent that some slight manual pressure can be supplementally employed to effect in holding the wheel temporarily snug against the hub especially when the vehicle is substantially tilted in the direction of the operator.

According to another feature of the invention, a special wheel-retaining, wheel guide pilot stud is provided which can be anchored to a conventional hub having a ring of regular openings therein, and which for its point of anchorage can use any one of the regular openings without any special structural changes being necessary to prepare the opening for reception of the special member providing the pilot stud. In actuality the special member prepares its own way while being forced into place into the hub opening with the effects already described.

Other features, objects and advantages will either be specifically pointed out or become apparent when reference is made to the following detailed description taken in conjunction with the accompanying drawings in which:

Figure 1 is a sectional view of a wheel and hub assembly to which the improved pilot stud has been applied;

Figure 2 is an enlarged fragmentary view similar to Figure 1;

Figure 3 is a face view of the wheel and hub assembly; and

Figure 4 is an enlarged fragmentary view similar to Figure 3.

In the drawing, the road wheel shown includes a rim 10 upon which is mounted a pneumatic tire 11 and which is supported by a web or wheel flange 12. The inner margin 14 of wheel flange 12 defines a central hub opening. In a generally surrounding relation to the hub opening the wheel flange 12 has a ring of openings, the centers of which conform to a common cylindrical path of revolution indicated at 15, and alternate ones of which are bolt-receiving openings 16 and wheel guide openings 18 respectively. The common cylindrical path of revolution defines a mean circumference for the ring of openings upon which the central axes of the latter lie. Each of the bolt-receiving openings 16 receives a wheel-retaining fastener 20 which may be a threaded bolt.

A plurality of springs 22, which may be used to secure a hub cap to the wheel or to secure a wheel cover thereto, is provided each spring having a positioning tang 24 and a rivet 23 for riveting the spring to the wheel flange. Slots 26 corresponding in number to the wheel guide openings and being located generally outwardly of the wheel guide openings 18, serve to retain the tangs 24 and may or may not extend radially inwardly into openings 18 through the flange edges 28 defining the latter.

The road wheel is mounted by bolts 20 to a hub or drum assembly including a drum section 30 secured in known manner to a radiating flange 32. The hub section 34 has a radiating flange structure 36 which radially overlaps with the flange 32, and an annular stepped portion 38 adjacent to which the inward edge 39 of flange 32 terminates. Hub 34 is formed with a central tapered opening 40 into which is received the complementary tapered portion 42 of a drive axle 44. The hub and tapered portion 42 have a keyway in which is received a key 46. Tapered portion 42 of the axle terminates in a threaded portion 48 on which is secured a retainer comprising a washer 50, a nut 52, and a cotter pin 54 for the nut.

In a generally surrounding relation to the hub proper, the hub flange structure 36 has a ring of openings, the centers of which conform to the above-described common cylindrical path of revolution 15 and alternate ones of which are threaded bolt-receiving bores 56 and rivet-receiving openings 58 respectively. The common cylindrical path of revolution 15 defines a mean circumference as well for the ring of hub assembly openings, upon which circumference the central axes of the openings lie.

In the rivet-receiving openings of the hub assembly is received a plurality of rivet members 60. The bolt-receiving openings 56 are threaded at 62 for threaded reception of the bolts 20. In one of the rivet-receiving openings 58 which pass through both the flange structures 32 and 36 is received a special rivet member 60ª. Special rivet member 60ª is provided with straight knurling 64 formed to give the effect of flutes to prevent the special rivet member proper from turning within the rivet-receiving opening 58. Special rivet member 60ª provides a pilot stud having a bevelled section 66, a slightly tapered section 68 and a cylindrical section 70. Adjacent cylindrical section 70 and in the shank of the pilot stud is provided a transverse depression 72 which may be an annular groove. The axis 78 of the pilot stud provided by special rivet member 60ª will be observed to be eccentrically located with respect to the axis of the rivet member proper and offset with respect to the mean circumference line 15 to an amount indicated by the dimension 76. The depression 72 will be observed at 74 to have a dimension substantially equal to the offset dimension 76. The fact should be appreciated then that when guide opening 18 is aligned with pilot stud, in order for the wheel itself to be centered the edge 28 of the guide opening must sink into depression 72, the distance indicated at 74 such as to compensate for the dimension of eccentricity 76 of the pilot stud portion of the special rivet member 60ª.

The technique for employing the present improvement may be set forth as follows. The hub assembly is approached with the road wheel in a slightly offcenter position such that the edges of the wheel guide opening 28 will accommodate the pilot stud provided by special rivet member 60ª. This initial position is shown in full lines in Figure 2. The road wheel is then tilted to the dotted position 80 of Figure 1 and the edge 28 of the wheel guide opening is permitted to advance along the pilot stud to a point at which it will sink into the depression 72. From the tilted position 80 of Figure 1, the road wheel may be swung into the plane of the hub assembly, and since the degree of eccentricity of the pilot stud is cancelled in effect by the depth of the depression 72, the road wheel will swing in effect into a generally concentric position with the hub section 34 such that the edges 14 of the hub opening will ride onto the annular stepped portion 38 of the hub section 34.

As already pointed out, the stepped portion 38 serves to prevent transverse shift of the wheel flange relative to the hub, and the shoulder provided by cylindrical section 70 of the pilot stud adjacent depression 72 serves to prevent axial shift of the road wheel relative to the hub assembly. Hence, under the usual circumstances, the mounting hub and the mounted wheel cooperate to produce a self-retaining assembly of themselves independently of and during application of the more permanent wheel attaching bolts. The dotted position 82 of Figure 2 best illustrates the intimate association self-maintained between wheel flange and hub assembly during the interval in which the wheel bolts are applied. The wheel is thus supportingly hung in position leaving the operator free to manipulate the attaching bolts without danger of the wheel falling from its illustrated position. It may happen, for instance as occasioned by unusual circumstances such as unusual tilt of the vehicle, that the operator who is mounting the road wheel, may want to steady the wheel with his hand and supplement the self-retaining action of the assembly in preventing any wobbling or swinging of the wheel and slight manual pressure may be used if desired, but ordinarily according to the invention the wheel may be left to itself while the bolts are initially applied and their threads are started.

As herein disclosed, the invention is shown embodied in a piloted wheel arrangement having an axle driven hub. It is evident that the present pilot stud will be equally effective in a piloted wheel arrangement of other types and that the wheel hub can be equally well mounted in bearings upon a non-rotatable spindle or steering knuckle. So also the drawing shows the hub member and the wheel member each to have a single ring of alternating openings but self-evidently there could be two corresponding rings on each member with the array of openings of the one type constituting one ring, and the array of openings of the other type constituting the other and separate ring. The stud providing rivet member is shown to have its eccentricity so directed as to be taken advantage of in a radially outward direction with respect to a mean circumference of the ring of openings, but it is indeed not essential to the invention that the eccentricity be measured radially outwardly at all and instead could be directed radially inwardly with respect to the same mean circumference of the ring of openings.

Variations within the spirit and scope of the invention described are equally comprehended by the foregoing description.

What is claimed is:

1. For use with a road wheel having a hub opening and a ring of alternating bolt-receiving and guide openings respectively thereabout, a hub assembly comprising in combination, a hub section having an annular stepped portion and flange structure radiating therefrom, said stepped portion being transversely engageable with the edges of said hub opening, means forming a ring of alternating bolt-receiving and rivet openings in said flange structure respectively corresponding in location to said wheel bolt-receiving and guide openings and registerable therewith, a drum section having an inner flange overlapping with said flange structure, and rivet members receivable in said rivet openings to rivet the flanges together and including a member having a knurled portion axially receivable such as to deform its receiving opening, and a pilot stud portion rigid with the knurled portion and in axial non-alignment therewith, said knurled portion being non-rotatable with respect to the flange opening for holding the pilot stud portion relatively offcenter with respect to a mean circumference of the ring of flange openings, said stud portion having a transverse depression into which the edge of a wheel guide opening may ride to permit said wheel hub opening and annular stepped portion to become concentric for effecting the transverse engagement aforesaid and permit said wheel and hub assembly bolt openings to register with one another.

2. For use with a road wheel having a hub opening and a ring of alternating bolt-receiving and guide openings respectively thereabout, a hub assembly comprising in combination, a hub section having radiating flange structure, means forming a ring of alternating bolt-receiving and rivet openings in said flange structure respectively corresponding in location to said wheel bolt-receiving and guide openings and registerable therewith, a drum section having an inner flange overlapping with said flange structure, and rivet members receivable in said rivet openings to rivet the flanges together and including a member having a knurled portion axially receivable such as to deform its receiving opening, and a pilot stud portion rigid with the knurled portion and in axial non-alignment therewith, said knurled portion being non-rotatable with respect to the flange opening for holding the pilot stud portion relatively offcenter with respect to a mean circumference of the ring of flange openings, said stud portion having a transverse depression into which the edge of a wheel guide opening may ride to permit said wheel and hub assembly bolt openings to register with one another.

3. In a hub assembly for use with a wheel disc having a ring of alternating bolt-receiving and pilot holes disposed in a common path of revolution, the combination of a hub section having radiating flange structure and a stepped annular portion at a relatively inner region of the flange structure, said flange structure being provided with a ring of bolt-receiving bores disposed in a path of revolution surrounding said annular portion and corresponding to said wheel common path of revolution aforesaid, said bolt-receiving holes and said bolt-receiving bores being registerable with one another, a drum section having a flange overlapping the flange structure of the hub section to a point in closely spaced adjacency with respect to the stepped annular portion thereof and formed with a ring of bolt openings in registry with said bores, and means connecting the overlapping portions of the flanges including a rivet member having an offset in the structure thereof providing an upstanding stud disposed offcenter with respect to a mean circumference of the bolt ring path of revolution, said rivet member being formed with an annular groove around the shank of the stud and of a depth substantially equal to the amount that the stud is offcenter to the mean circumference aforesaid, said stud shank receiving in the annular groove thereof the edge of said wheel pilot holes when the wheel is in a lean-to position with respect to said hub assembly, and upon relative elevation of said hub assembly to an aligned position with said wheel causing the wheel to be pulled onto said hub assembly into concentric relation therewith.

4. For use with a bolt-supported road wheel having a hub opening and a ring of a plurality of radially aligned openings therearound forming alternate bolt-receiving and guide openings respectively, a hub assembly having an annular stepped portion receivable in said hub opening and engageable with the edges of the latter so as to be held against relative transverse shift, and flange structure radiating from said stepped portion and provided with a matching ring of openings to said wheel ring of openings and forming alternate bolt-receiving and rivet-receiving openings respectively, and rivet members in said rivet-receiving openings including a member having a portion coaxial with and non-rotatably held in one rivet-receiving opening, and a pilot stud providing portion rigid therewith and predeterminedly eccentric with respect to said one opening, said stud-providing portion having an annular groove in the shank thereof, said stud-providing portion when initially engaged in the guide openings causing the wheel to assume an offcenter relationship with the hub assembly and the groove thereof permitting the engaged edges of the guide opening to ride thereinto and allow the wheel to swing toward the plane of the hub assembly into concentric relationship such that the stepped hub portion can engage the edges of the wheel hub opening in the above described manner, the engaged edges of the guide opening being thereafter retained by said groove so long as the wheel is retained in centered position.

5. For use with a road wheel having a hub opening and a ring of a plurality of radially aligned openings therearound forming alternate bolt-receiving and guide openings respectively, a hub assembly having an annular stepped portion receivable in said hub opening and engageable with the edges of the latter so as to be held against relative transverse shift, and flange structure radiating from said stepped portion and provided with a matching ring of openings to said wheel ring of openings and forming alternate bolt-receiving and rivet-receiving openings respectively, and rivet members in said rivet-receiving openings including a member having a portion coaxial with the non-rotatably held in one rivet-receiving opening, and a pilot stud providing portion rigid therewith and predeterminedly eccentric with respect to said one opening in a direction away from a mean circumference of said openings ring, said stud-providing portion having an annular groove in the shank thereof of a depth substantially equal to the magnitude of eccentricity of said stud providing portion away from the mean circumference aforesaid, said stud providing portion when initially engaged in the guide openings causing the wheel to assume an offcenter relationship with the hub assembly and the groove thereof permitting the engaged edges of the guide opening to ride thereinto and as a center to allow the wheel to swing toward the plane of the hub assembly into a concentric relationship such that the stepped hub portion can engage the edges of the wheel hub opening in the above described manner.

ARCHIE M. NIVEN.

References Cited in the file of this patent

UNITED STATES PATENTS

| Number | Name | Date |
|---|---|---|
| 1,624,356 | Nelson | Apr. 12, 1927 |
| 1,815,821 | Baker | July 21, 1931 |
| 2,107,925 | Ash | Feb. 8, 1933 |

FOREIGN PATENTS

| Number | Country | Date |
|---|---|---|
| 32,636 | France | Oct. 4, 1927 |
| | (Addition to 617,253) | |
| 617,253 | France | Nov. 19, 1926 |